Dec. 8, 1936.  A. C. DURDIN, JR  2,063,301
AERATOR
Filed Dec. 24, 1934
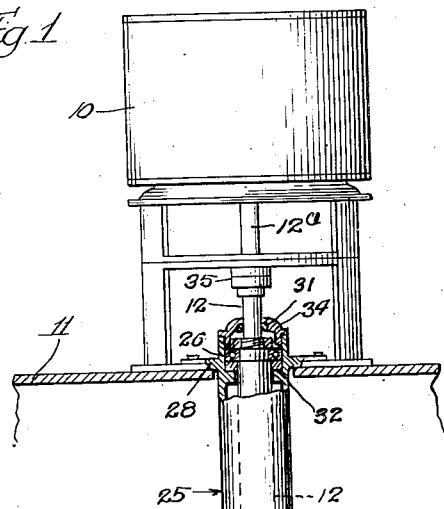
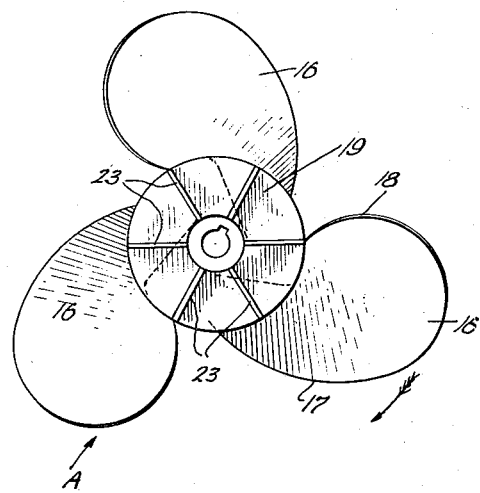
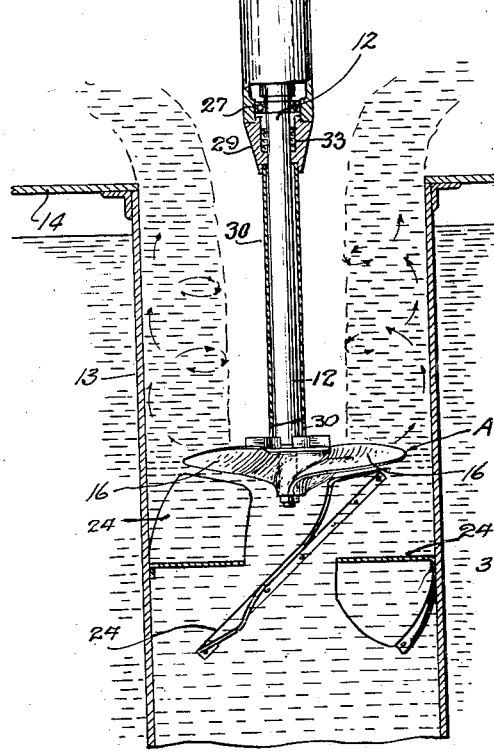
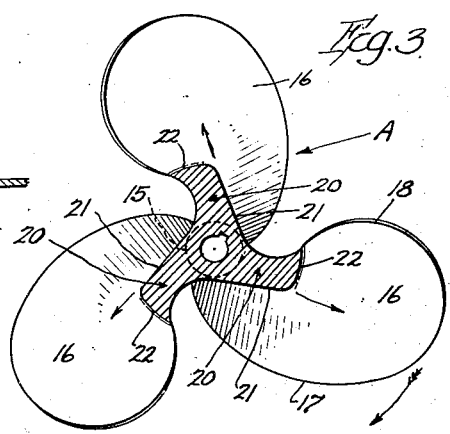
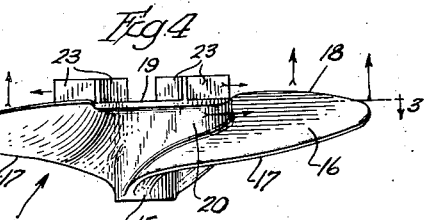
Inventor:
Augustus C. Durdin, Jr.,
by
Atty.

Patented Dec. 8, 1936

2,063,301

UNITED STATES PATENT OFFICE 2,063,301

AERATOR

Augustus C. Durdin, Jr., Niles Center, Ill., assignor to Chicago Pump Company, Chicago, Ill., a corporation of Illinois Application December 24, 1934, Serial No. 759,043

13 Claims. (Cl. 261—83)

This invention relates to aerators and its principal object is to impregnate liquids with air or gas. In the treatment of liquids for certain purposes, abundant quantities of oxygen or other gas are supplied thereto and various attempts have been made to accomplish this result with more or less success. In the activated sludge process of treating sewage, aerobic bacteria are used, and in this process it is necessary to supply the bacteria with abundant quantities of oxygen.

One object of this invention is to provide a simple and highly efficient aerator, operating to supply abundant quantities of air to sewage or other liquid and desirably composed of a single unitary structure.

Another object is to lift or propel sewage or other liquid from an upright conduit and discharge the same therefrom in the form of a hollow column impregnated with air, whereby the aerated sewage or other liquid discharges uniformly in all directions from the conduit.

Other objects and advantages will appear in the course of the following specification and with said objects and advantages in view, this invention consists in the several novel features hereinafter fully set forth and claimed.

The invention is clearly illustrated in the accompanying drawing, in which:

Fig. 1 is a view, partly in side elevation and partly in vertical section of aerating apparatus equipped with an aerator embodying a simple form of the present invention;

Fig. 2 is a plan of the aerator;

Fig. 3 is a view, partly in plan and partly in horizontal section taken on the line 3—3 of Fig. 4, and Fig. 4 is a side elevation of the aerator.

Referring to said drawing, the reference character 10 designates an electric motor or other prime mover, mounted on a bridge structure 11, and provided with a shaft 12 depending therefrom. The bridge or platform is usually placed above a tank (not shown) for containing the liquid to be treated and in the tank is an upright, open ended, conduit, a fragment of which is seen at 13. In some instances a splash platform 14 extends from the upper end of the conduit, and the aerated liquid is splashed upon said platform by the aerator and discharged therefrom into the liquid contained in the tank. The parts described are now common and well known and require no further description so far as this specification is concerned.

Keyed or otherwise rigidly mounted upon the shaft 12, within the conduit 13, is the aerator, designated generally by the character A. It is formed with a body or hub 15 by means of which it is mounted on the shaft, and projecting radially therefrom are several propeller blades 16 of conventional form. Desirably each blade has a leading or entering edge 17 extending from the face of the lower end of the body 15 in an inclined direction along a non-concentric curved line, somewhat in the nature of an involute curve. At the outer extremity of each blade the curved edge is carried back and around to the rear of the blade where the receding edge 18 is reversely curved and merges into the body portion. Each blade is pitched upward in a direction opposite to the direction of rotation of the impeller whereby to thrust the liquid in a direction approximately parallel with the axis of the impeller, or more specifically, in an upward direction. The exact shape of blade described is taken for the purposes of illustration only, and it is to be understood that I do not limit my invention to the particular shape shown and described. This form of blade, however, has been found in actual practice, to be highly efficient for the purpose intended, since the thrust is upward, with very little centrifugal action on the liquid.

At or adjacent the upper end of the body is a liquid deflecting element 19, here shown as comprising an annular flange or web that projects from the body. Desirably the deflecting element 19 is located at or slightly below the highest point of the propeller blades. As shown the deflecting element is flat on its underside, but not necessarily so, and its radius is considerably less than the radius of the propeller blades. The deflecting element assists in directing radially outward that part of the upwardly moving column of liquid below the deflecting element, whereby the liquid is thrust upwardly above the aerator by the propeller blades in the form of a hollow column of liquid.

Between the propeller blades and deflecting element 19 are impeller blades 20 the impelling faces of which project tangentially from the cylindrical face of the body or hub 15 of the aerator part way across the propeller blades and serve to impart a centrifugal action to that part of the liquid which the propeller blades thrust upward in their path of rotation, thereby throwing liquid into the hollow column of liquid passing the impeller blades. The working faces 21 of the impeller blades 20 are straight or slightly curved, but they may take various desirable shapes that are designed to impart centrifugal action to the liquid. As a preference the impeller blades do not project beyond the deflecting element and their tips 22 may coincide with the marginal edge thereof, if desired, as is shown in Fig. 2. A vacuum zone is produced at the tips of the impeller blades when in operation, the purpose of which will be presently explained. Desirably the working faces of the impeller blades, propeller blades and deflecting element are joined by fillets or rounded corners.

The deflecting element 19 also carries fan blades 23, which as shown project radially inward from the marginal edge of the deflecting element, on the upper side thereof, thus providing a fan or blower operating to force air into the vacuum zone at the tips of the impeller blades and into the rolling, turbulent hollow column of liquid surrounding and passing by the fan.

In operation, the aerator is rotated at high speed. The propeller blades pick up and thrust the liquid upward at great velocity, causing more or less of a turbulent condition therein. The inner part of the moving column of liquid is caught below the deflecting element by the impeller blades and thrown outward laterally into the moving column of liquid, thereby setting up a greater turbulent condition therein, and tending to prevent the hollow column of liquid from closing in around the aerator shaft, and at the same time, the fan blows air into the vacuum zones and into the turbulent hollow stream, thereby effectively supplying an abundant quantity of air thereto. The general direction of movement of the hollow stream is upward and slightly outward, whereby as its momentum slows down, it tumbles down upon the platform outside the conduit. It will be understood that air is free to descend through the hollow of the stream to the fan.

Although the general direction of movement of the hollow column of liquid is approximately parallel with the axis of the propeller, the liquid takes a path somewhat in the nature of a helix, winding or circling upward from the propeller. The liquid thrown into the hollow column by the impeller blades appears to take a circling path in upward directions, in the helically moving column (see dotted lines in Fig. 1). As a result the internal surface of the hollow column of liquid is constantly changing, new surfaces are constantly being exposed to the air in the hollow of the column and as these changing surfaces become exposed to the air they absorb air and roll the air into the liquid. Owing to the multiplicity of constantly changing surfaces of the liquid that are exposed to the air, a greater amount of air is carried into the liquid than heretofore.

In my experiments I have found that the fan may be omitted and good results obtained. For many purposes the deflector may be dispensed with and the impeller blades may be omitted, but when the deflector is used it is preferable to employ walls between the propeller blades and deflector to prevent solid or semi-solid matter from being caught between the propeller blades and the deflector, when large propellers are used, the efficiency of the aerator is increased by the use of baffles 24 located directly below the propeller and preferably inclining upward at a suitable angle in the direction of rotation of the propeller.

The motor 10 usually is located at some distance above the level of the liquid in the tank, and inasmuch as the aerator A is located below the liquid level, a relatively long aerator shaft 12 is employed to connect the motor with the aerator.

A shaft coupling 35 connects the motor shaft and aerator shaft. It is undesirable to provide a bearing for the lower end of the shaft, and consequently novel bearings are provided therefor separate from and located below the motor shaft 12ª. As shown a bearing housing 25 is provided around the upper end of the aerator shaft in which are contained upper and lower shaft bearings 26, 27. A flange 28 formed on the housing adjacent its upper end supports the housing, and the upper bearing 26 supports the shaft. A lower bearing cap 29 closes the lower end of the housing and a shaft cover tube 30 is secured to the lower end of the cap 29 and surrounds the end of the shaft that projects below the cap. Oil or grease seals 31, 32 are provided at the upper end of the housing and an oil or grease seal 33 is provided in the cap 29. An upper bearing cap 34 closes the upper end of the housing. Oil or grease is supplied to the bearings in any desirable manner.

From the above it will be seen that a long bearing, separate from the motor bearings, is provided for the aerator shaft, which eliminates the necessity of providing a bearing at the lower end of the shaft. The bearing described also permits the aerator shaft to be raised in case it becomes necessary to reach the impeller for repairs or for other reasons. The shaft cover tube, being stationary, prevents strings, rags or the like from wrapping around the shaft, and interfering with the operation of the aerator.

I claim as new and desire to secure by Letters Patent:

1. An aerator comprising a body portion having propelling blades projecting therefrom pitched to propel liquid in a direction approximately parallel to the axis of the aerator, and centrifugally acting impelling elements extending transversely with respect to the axis of the aerator, and disposed between the entering and receding edges of the propelling blades.

2. An aerator comprising a body portion having propelling blades projecting therefrom, pitched to propel liquid in a direction approximately parallel to the axis of the aerator, and centrifugally acting impeller blades projecting from the body, part way over the propelling blades and being disposed between their entering and receding edges.

3. An aerator comprising a body portion having propelling blades projecting therefrom, and centrifugally acting impeller blades projecting from the body portion part way across the propeller blades, the impeller faces of said impelling blades extending in lines tangential to the face of the body portion.

4. An aerator comprising a body portion having propeller blades projecting therefrom, pitched to propel liquid in a direction approximately parallel with the axis of the aerator, a deflecting element spaced above the blades and projecting from the body portion part way over the propeller blades and impeller blades extending from the body between the propeller blades and deflecting element.

5. An aerator comprising a body portion having propeller blades projecting therefrom, an annular flange projecting from the body part way over the propeller blades, and centrifugally acting impeller blades of less radial extent than the propeller blades, extending from the body and disposed between the propeller blades and flange.

6. An aerator comprising a body portion having propeller blades projecting therefrom, pitched to thrust liquid in a direction approximately parallel to the axis of the aerator, an annular flange projecting from the body portion part way over the propeller blades in a plane below the highest point on the blades, and centrifugally acting impeller blades joining the propeller blades and flange.

7. An aerator comprising a body portion having propeller blades projecting therefrom, pitched to thrust liquid in a direction approximately parallel to the axis of the aerator, a deflecting element adjacent the upper edges of the blades and fan blades of less radial extent than the propeller blades, carried by said deflecting element.

8. An aerator comprising a body portion having propeller blades projecting therefrom, impeller blades above the propeller blades projecting part way across the same, and a fan above the impeller blades.

9. An aerator comprising a body portion having propeller blades projecting therefrom, centrifugally acting impeller blades above the propeller blades projecting part way across the same, and a combined deflecting element and fan above the impeller blades.

10. In an aerator, liquid propelling means for thrusting a column of liquid in a direction parallel with the axis of the aerator, and impelling means joining the upper faces of the propelling means, for throwing part of the moving liquid outward radially into the column of liquid.

11. In an aerator, propelling means for thrusting a column of liquid in a direction parallel with the axis of the aerator, deflecting means for deflecting outward the inner part of the column of liquid, centrifugally acting means between the propelling means and deflecting means for throwing the inner part of the column outward into the surrounding body of liquid, and air blowing means adjacent the centrifugally acting means.

12. An aerator, comprising an open ended conduit into which liquid to be treated enters at its lower end and is discharged therefrom at its upper end, propelling means adjacent the upper end of the conduit for propelling the liquid therein upward in the form of a hollow column with its internal face contacting with air and discharging it therefrom, and means submerged in the liquid below the hollow liquid column for setting up turbulence in the rising hollow liquid column.

13. An aerator, comprising an open ended conduit into which liquid to be treated enters at its lower end, propelling means adjacent the upper end of the conduit for propelling the liquid therein upwards in the form of a hollow column and discharging it therefrom, means submerged in the liquid below the hollow liquid column for setting up turbulence in the rising hollow liquid column, and means for supplying air to the internal face of the hollow liquid column.

AUGUSTUS C. DURDIN, Jr.